United States Patent
Zhang et al.

(10) Patent No.: US 11,958,386 B2
(45) Date of Patent: Apr. 16, 2024

(54) POWER SUPPLY MECHANISM FOR LONG-STROKE SEAT

(71) Applicant: Yanfeng Adient Seating Co., Ltd., Shanghai (CN)

(72) Inventors: Hui Zhang, Shanghai (CN); Yong Long, Shanghai (CN); Jingjing Shi, Shanghai (CN); Qiuwei Zhang, Shanghai (CN); Dingyu Wang, Shanghai (CN)

(73) Assignee: Yanfeng Adent Seating Co., Ltd., Shanghai (CN)

( * ) Notice: Subject to any disclaimer, the term of this patent is extended or adjusted under 35 U.S.C. 154(b) by 369 days.

(21) Appl. No.: 17/309,358

(22) PCT Filed: Nov. 29, 2019

(86) PCT No.: PCT/CN2019/121828
§ 371 (c)(1),
(2) Date: May 21, 2021

(87) PCT Pub. No.: WO2020/140660
PCT Pub. Date: Jul. 9, 2020

(65) Prior Publication Data
US 2022/0016997 A1    Jan. 20, 2022

(30) Foreign Application Priority Data

Jan. 2, 2019   (CN) .......................... 201910000484.2

(51) Int. Cl.
*B60R 16/02*    (2006.01)
*B60N 2/02*    (2006.01)
*B60N 2/07*    (2006.01)

(52) U.S. Cl.
CPC ......... *B60N 2/0224* (2013.01); *B60N 2/0722* (2013.01); *B60R 16/0215* (2013.01)

(58) Field of Classification Search
CPC .... B60R 16/0215; B60R 16/03; B60N 2/0722
See application file for complete search history.

(56) References Cited

FOREIGN PATENT DOCUMENTS

| CN | 102216121 A | * | 10/2011 | ........... B60N 2/0705 |
|----|-------------|---|---------|------------------------|
| CN | 102549865 A | * | 7/2012  | ......... B60R 16/0215 |
| CN | 108475910 A | * | 8/2018  | .............. B60N 2/07 |
| CN | 110641322 A | * | 1/2020  |                        |
| CN | 111775785 A | * | 10/2020 |                        |

(Continued)

*Primary Examiner* — Timothy J Brindley
(74) *Attorney, Agent, or Firm* — Wang Law Firm, Inc.

(57) ABSTRACT

A power supply mechanism for a long-stroke seat has a wire harness accommodation box having at least one accommodation space and at least one opening; a drag chain bent and accommodated in the accommodation space, where a first end of the drag chain is relatively fixed to the wire harness accommodation box, and a second end of the drag chain passes through the opening and is slidably disposed in a slideway of a lower slide rail of the seat; a wire harness threaded in the drag chain, where a first end of the wire harness passes through a first end of a wire harness channel and the opening to be connected to a power supply, and a second end of the drag chain passes through a second end of the wire harness channel to be connected to an upper slide rail of the seat.

5 Claims, 8 Drawing Sheets

(56) References Cited

FOREIGN PATENT DOCUMENTS

| | | | | | |
|---|---|---|---|---|---|
| CN | 111923788 | A | * | 11/2020 | |
| JP | 2020078169 | A | * | 5/2020 | ........... B60N 2/0715 |
| KR | 20200058186 | A | * | 5/2020 | |

* cited by examiner

POWER SUPPLY MECHANISM FOR LONG-STROKE SEAT

BACKGROUND

Technical Field

The present invention relates to the technical field of seat structures, and in particular, to a power supply mechanism for a long-stroke seat.

Related Art

For seats of an ordinary car, strokes for adjusting the seats frontward and rearward are generally less than 300 mm, which are less than a length of a seat cushion in a direction X. Therefore, a wire harness may be directly connected to the seat from a vehicle body to prevent the wire harness from being exposed during movement. However, for mid-row seats of an MPV/SUV, a seat adjustment stroke is usually greater than a length of the seat cushion in the direction X. If the wire harness is directly connected to the seat, a poor appearance and safety hazards such as exposure of the wire harness and abrasion tendency are caused.

At present, there are two main solutions for power supply of a long slide rail. In a first arrangement, an additional power supply rail is added, and a slider needs to be arranged to slidably connect to a wire harness. In addition, the same row of seats requires two power supply rails on the left and right, and the power supply rails need to be exposed from a carpet of a vehicle body, which has defects such as a poor appearance. In another power supply mode, a wire harness accommodation box is disposed at a side of a slide rail of the seat. The wire harness extends from the wire harness accommodation box and then enters a slide rail of the seat from an end of the slide rail to connect to the seat. When there is only one row that requires a long stroke, a plurality of wire harness accommodation slots are required.

SUMMARY

In view of some existing or potential problems in the prior art, the present invention provides a power supply mechanism for a long-stroke seat, which can achieve frontward and rearward adjustment of the long-stroke seat. A wire harness and a seat share a rail to hide the wire harness inside an accommodation box and a slide rail of the seat, to prevent foreign objects from damaging the wire harness and the wire harness from being exposed.

The present invention adopts the following technical solutions to achieve the above objective. A power supply mechanism for a long-stroke seat includes:
- a wire harness accommodation box having at least one accommodation space and at least one opening in communication with the accommodation space;
- a drag chain having a wire harness channel, where the drag chain is bent and accommodated in the accommodation space, a first end of the drag chain is relatively fixed to the wire harness accommodation box, a second end of the drag chain passes through the opening and is slidably disposed in a slideway of a lower slide rail of the seat, and two ends of the wire harness channel pass through two ends of the drag chain; and
- a wire harness threaded in the wire harness channel, where a first end of the wire harness passes through a first end of the wire harness channel and the opening to be connected to a power supply, and a second end of the wire harness passes through a second end of the wire harness channel to be connected to an upper slide rail of the seat.

Beneficial effects of the present invention are as follows. The wire harness accommodation box is used to accommodate the drag chain, the wire harness is threaded in the drag chain, one end of the drag chain is relatively fixed to the wire harness accommodation box, the other end of the drag chain extends out of the wire harness accommodation box and is slidably disposed in the slideway of the lower slide rail of the seat, one end of the wire harness is connected to the power supply (such as a vehicle central control system), and the other end of the wire harness passes through the drag chain to be connected to the upper slide rail of the seat, so that the wire harness is accommodated in the wire harness accommodation box and the lower slide rail of the seat through the drag chain. In this way, the wire harness and the seat share the lower slide rail. As the upper slide rail moves along the lower slide rail, the wire harness can move along the lower slide rail with the upper slide rail. The drag chain in the wire harness accommodation box extends out or retracts with the wire harness, thereby satisfying the need to supply power to long-stroke seats.

In some embodiments, a drag chain adapter is connected to the opening of the wire harness accommodation box, where the drag chain adapter has an inner turning channel for the drag chain to pass through, the turning channel extends through a first side portion and a second side portion of the drag chain adapter, the first side portion is connected to the opening, the second side portion is connected to the lower slide rail of the seat, and the turning channel is in communication with the slideway of the lower slide rail of the seat.

In some embodiments, the wire harness accommodation box is transversely disposed on ends of a plurality of lower slide rails of the seat that are arranged in parallel.

In some embodiments, the wire harness accommodation box is disposed on side portions of a plurality of lower slide rails of the seat that are arranged in a straight line.

In some embodiments, the turning channel is L-shaped or U-shaped.

In some embodiments, a rail slot having an upper opening is provided on the second side portion of the drag chain adapter, an end of the lower slide rail is vertically snap-fitted into the rail slot, and the upper opening of the rail slot is covered by a slide rail end cover.

In some embodiments, the second end of the drag chain is threaded in the turning channel, the first end of the drag chain is fixedly connected to the first side portion of the drag chain adapter, an additional channel and an additional opening that are opened to the first end of the drag chain are further provided on the drag chain adapter, and the first end of the wire harness successively passes through the additional channel and the additional opening to be connected to the power supply.

In some embodiments, a dovetail structure for matched sliding is provided on a surface of an inner wall of the slideway of the lower slide rail of the seat that contacts the drag chain.

In some embodiments, the accommodation space is strip-shaped, two openings are respectively provided at both ends of the strip-shaped accommodation space, two drag chains are disposed in the accommodation space, and two ends of each of the drag chains are correspondingly disposed at one of the openings.

In some embodiments, the two drag chains are disposed on two longitudinal sides of the accommodation space in a length direction of the accommodation space; or the two drag chains are disposed on two lateral sides of the accommodation space in a width direction of the accommodation space, and a middle separator for separating the two drag chains is disposed in the accommodation space.

BRIEF DESCRIPTION OF THE DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION

The implementations of the invention are described below through specific examples. Those skilled in the art can easily understand the other advantages and effects of the present invention from the content disclosed in this specification. The present invention may also be implemented or applied through other different specific implementations. Various details in this specification may also be modified or changed based on different viewpoints and applications without departing from the spirit of the present invention.

The following further describes the present invention in detail with reference to the accompanying drawings and specific embodiments.

Figure 1:
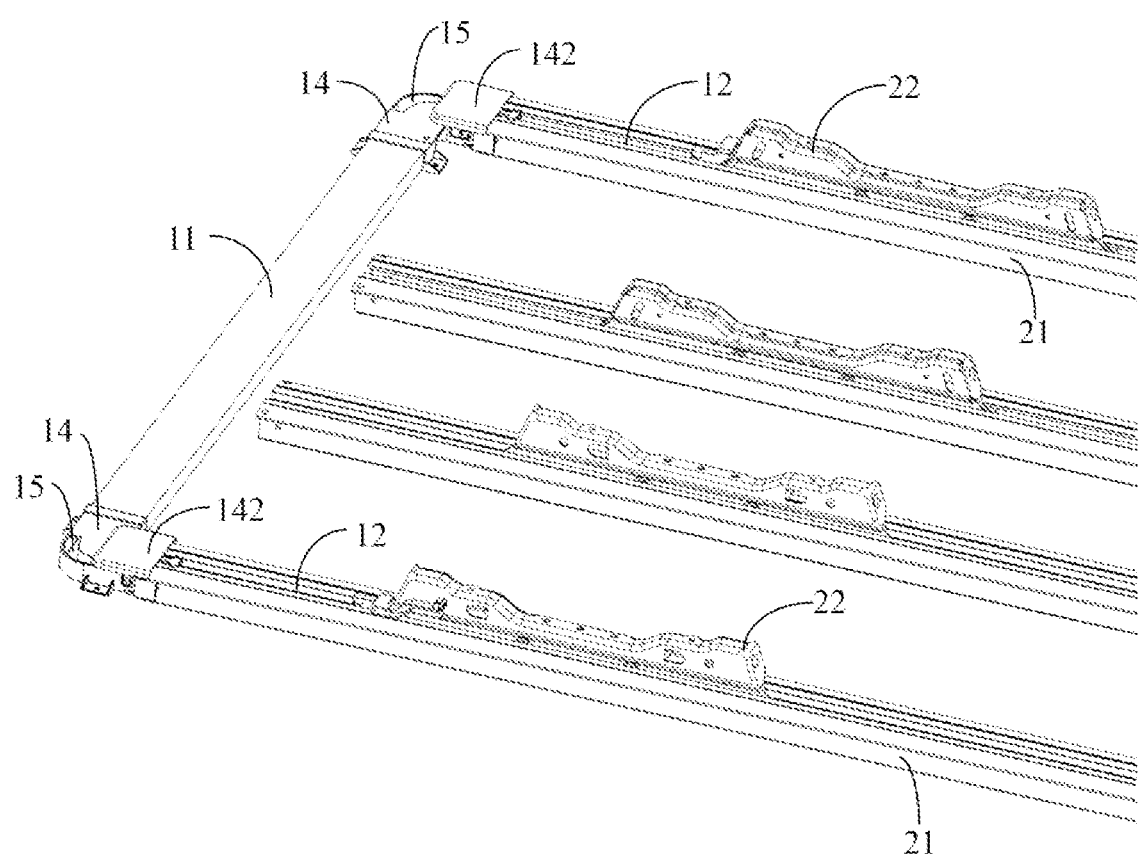
FIG. 1 is an overall schematic structural diagram of a power supply mechanism for a long-stroke seat according to a first embodiment of the present invention.
Figure 2:
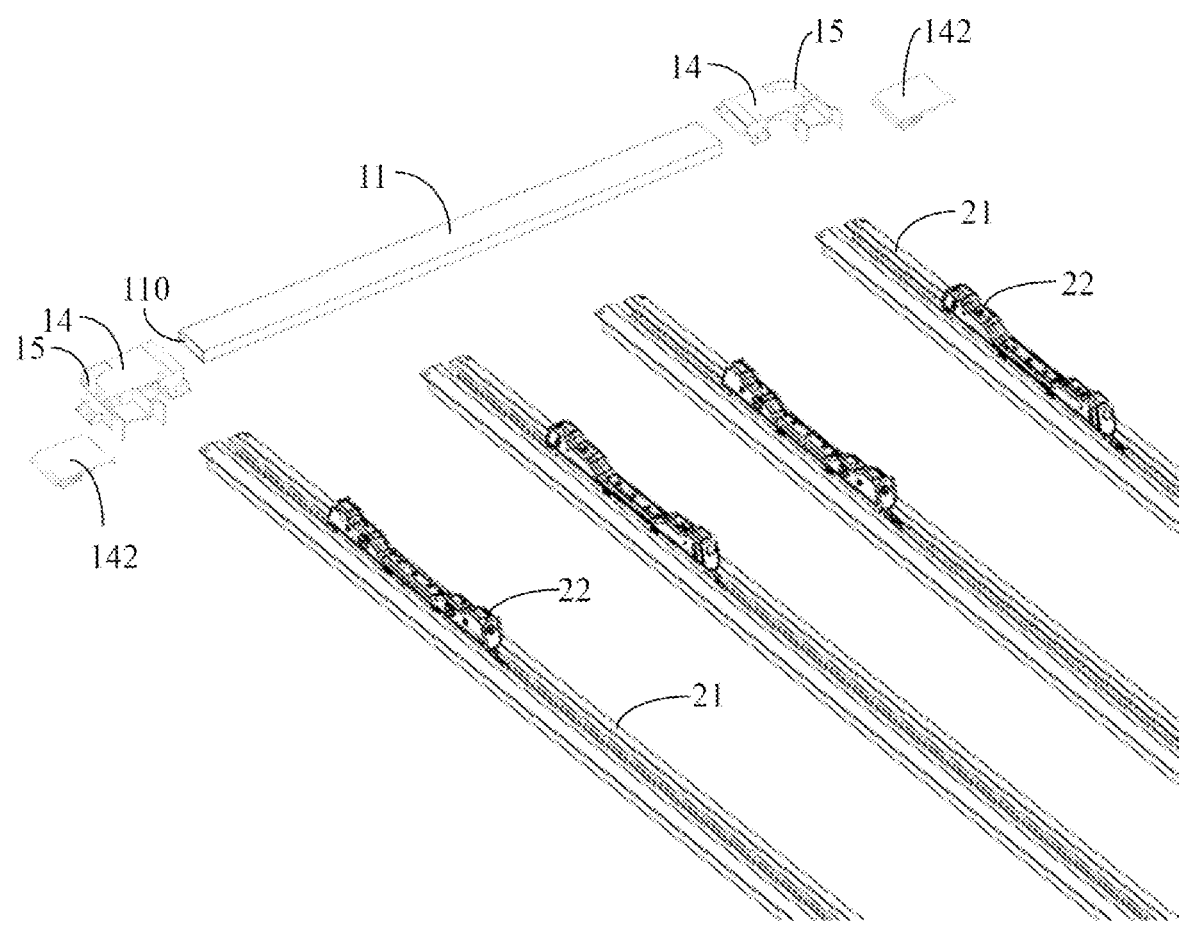
FIG. 2 is a schematic diagram of a disassembled structure of the power supply mechanism for a long-stroke seat according to the first embodiment of the present invention.
Figure 4:
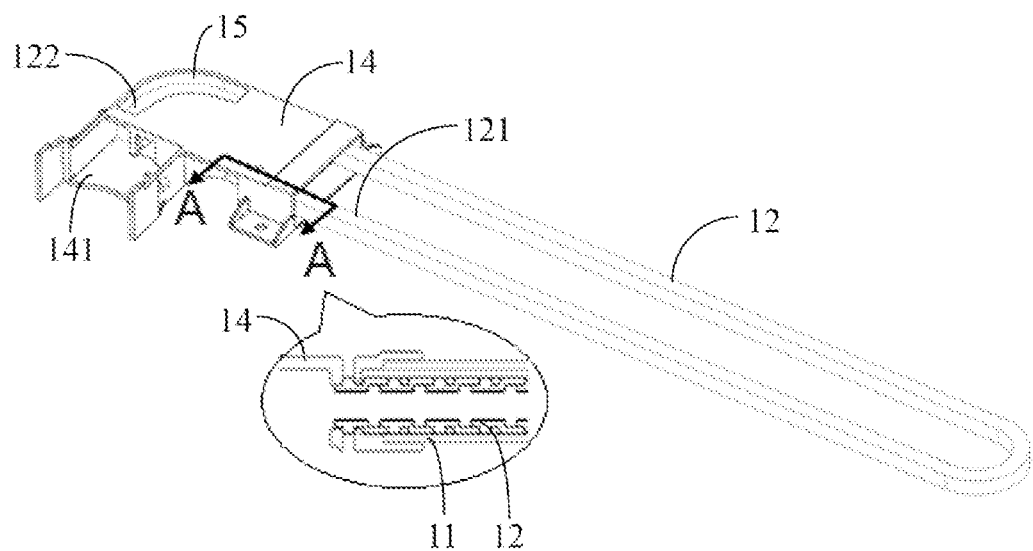
FIG. 4 is a schematic diagram of a connection structure between a drag chain and the drag chain adapter according to the first embodiment of the present invention and an enlarged schematic diagram of a cross section at A-A in the figure.

Referring to FIG. 1, FIG. 2, and FIG. 4, FIG. 1 illustrates an overall schematic structural diagram of a power supply mechanism for a long-stroke seat according to a first embodiment of the present invention, FIG. 2 illustrates a schematic diagram of a disassembled structure of the power supply mechanism for a long-stroke seat according to the first embodiment of the present invention, and FIG. 4 illustrates a schematic diagram of a connection structure between a drag chain and the drag chain adapter according to the first embodiment of the present invention and an enlarged schematic diagram of a cross section at A-A in the figure. As shown in the figures, embodiments of the present invention provide a power supply mechanism for a long-stroke seat, which is applicable to a seat having a long-stroke slide rail at a bottom, especially applicable to a vehicle seat having a bottom that can move along the long-stroke slide rail. The bottom of the seat is connected to an upper slide rail, a lower slide rail is fixed to a floor of a vehicle body, and the upper slide rail is slidable along the lower slide rail. The seat power supply mechanism adopts an energized wire harness. One end of the energized wire harness is connected to the power supply (such as a vehicle central control system or other power sources on a vehicle body or an external power source), and the other end of the wire harness is connected to a control system of the seat (for example, directly connected to the control system or electrically connected to the control system of the seat through the upper slide rail), so as to achieve power supply of the seat power supply mechanism.

As shown in FIG. 1, FIG. 2, and FIG. 4, the power supply mechanism for a long-stroke seat is mainly composed of three parts: a wire harness accommodation box 11, a drag chain 12, and a wire harness. The wire harness accommodation box 11 has at least one accommodation space and at least one opening 110 in communication with the accommodation space. The drag chain 12 has a wire harness channel. Two ends of the wire harness channel pass through two ends of the drag chain 12. The drag chain is bent and then accommodated in the accommodation space inside the wire harness accommodation box 11. A first end 121 of the drag chain 12 is relatively fixed to the wire harness accommodation box 11, and a second end 122 of the drag chain 12 passes through the opening 110 on the wire harness accommodation box 11 and is slidably disposed in a slideway of a lower slide rail 21 of the seat. The wire harness is threaded in the wire harness channel inside the drag chain 12, a first end of the wire harness passes through a first end of the wire harness channel and the opening 110 on the wire harness accommodation box 11 to be connected to a power supply, and a second end of the wire harness passes through a second end of the wire harness channel to be connected to an upper slide rail 22 of the seat. The upper slide rail 22 of the seat may be slidably disposed on the lower slide rail 21 of the seat, and the upper slide rail 22 of the seat may electrically connect the wire harness to the control system of the seat.

According to the power supply mechanism for a long-stroke seat in this embodiment of the present invention, the wire harness accommodation box is used to accommodate the drag chain, the wire harness is threaded in the drag chain, one end of the drag chain is relatively fixed to the wire harness accommodation box, the other end of the drag chain extends out of the wire harness accommodation box and is slidably disposed in the slideway of the lower slide rail of the seat, one end of the wire harness is connected to the power supply (such as a vehicle central control system), and the other end of the wire harness passes through the drag chain to be connected to the upper slide rail of the seat, so that the wire harness is accommodated in the wire harness accommodation box and the lower slide rail of the seat through the drag chain. The wire harness shares the lower slide rail with the seat. As the upper slide rail moves along the lower slide rail, the wire harness can move along the lower slide rail with the upper slide rail. The drag chain in the wire harness accommodation box extends out or retracts with the wire harness, thereby satisfying the need to supply power to long-stroke seats.

Figure 5:
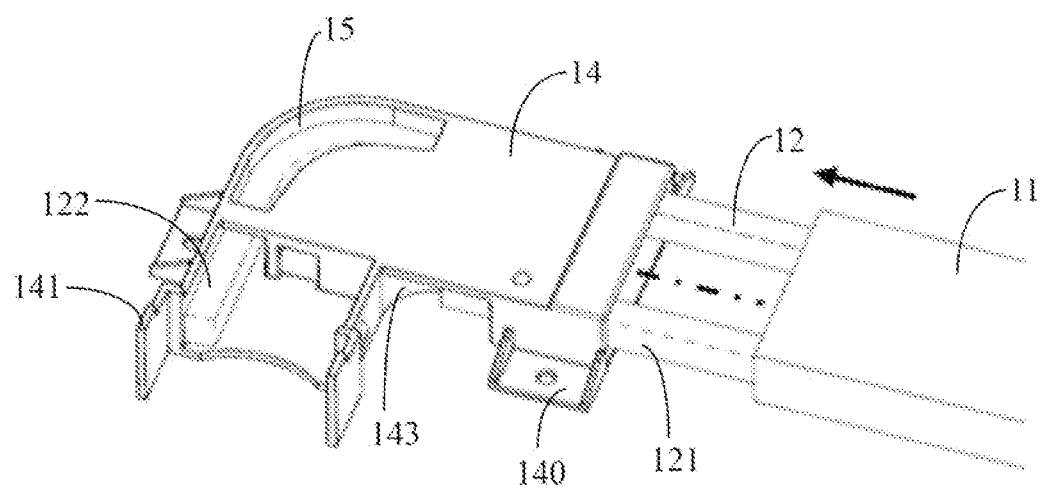
FIG. 5 is a schematic diagram of a connection structure between the drag chain adapter and a wire harness accommodation box according to the first embodiment of the present invention.
Figure 6:
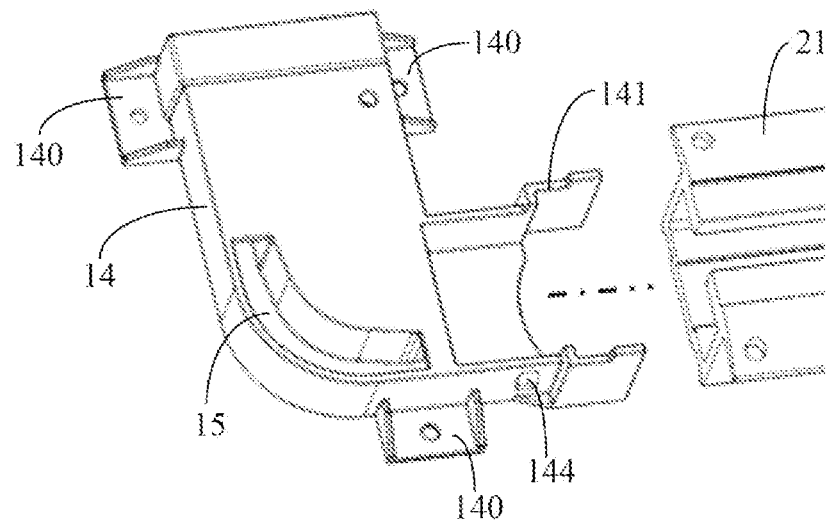
FIG. 6 is a schematic diagram of a connection structure between the drag chain adapter and a lower slide rail of the seat according to the first embodiment of the present invention.
Figure 7:
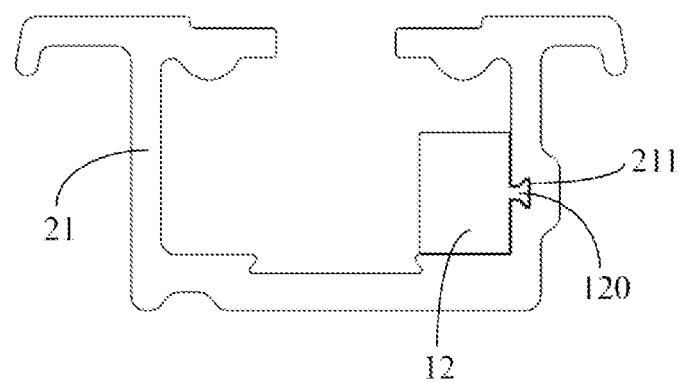
FIG. 7 is a schematic diagram of a connection structure between the lower slide rail of the seat and a drag chain according to the first embodiment of the present invention.

Preferably, as shown in FIG. 3 to FIG. 7, FIG. 3 illustrates an enlarged schematic structural diagram of a drag chain adapter according to the first embodiment of the present invention, FIG. 5 illustrates a schematic diagram of a connection structure between the drag chain adapter and the wire harness accommodation box according to the first embodiment of the present invention, FIG. 6 illustrates a schematic diagram of a connection structure between the drag chain adapter and the lower slide rail of the seat according to the first embodiment of the present invention, and FIG. 7 illustrates a schematic diagram of a connection structure between the lower slide rail of the seat and the drag chain according to the first embodiment of the present invention.

Figure 3:
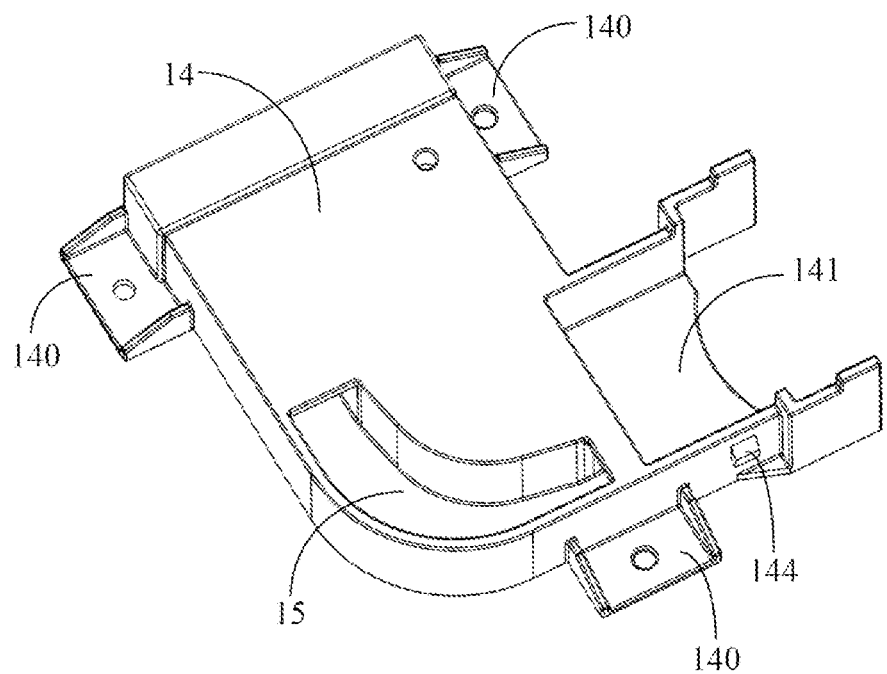
FIG. 3 is an enlarged schematic structural diagram of a drag chain adapter according to the first embodiment of the present invention.

As shown in the figure, the power supply mechanism for a long-stroke seat in this embodiment of the present invention further includes a drag chain adapter 14. The drag chain adapter 14 is connected between the opening 110 on the wire harness accommodation box 11 and the lower slide rail 21 of the seat. Anchor plates 140 are disposed on bottoms of a periphery of the drag chain adapter 14. Holes are formed on the anchor plates 140 that are fixed to the floor of a vehicle body with screws, as shown in FIG. 3. The drag chain adapter 14 has an inner turning channel 15 for the drag chain to pass through. The turning channel 15 extends through a first side portion and a second side portion of the drag chain adapter 14, the first side portion is connected to the opening 110 on the wire harness accommodation box 11, the second side portion is connected to the lower slide rail 21 of the seat, and the turning channel 15 is in communication with the slideway of the lower slide rail 21 of the seat. The second end of the drag chain 12 is threaded in the turning channel 15. A width of the turning channel 15 matches a width of a single drag chain, which can guide the drag chain, so that a direction of a drag chain entering the drag chain adapter can be changed along a path of the turning channel. The first end of the drag chain 12 is fixedly connected to the first side portion of the drag chain adapter 14, and a socket is formed on the first side portion of the drag chain adapter 14. A size of the socket matches a size of the opening 110 on the wire harness accommodation box. During connection, the socket is sleeved on the opening 110, and the first end of the drag chain 14 passes through the socket into the drag chain adapter. An additional channel and an additional opening 143 that are opened to the first end of the drag chain are further provided on the drag chain adapter. As shown in FIG. 5, the additional channel is located inside the drag chain adapter, and has a shape similar to a shape of the turning channel. The additional opening 143 is located on a surface of the second side portion of the drag chain adapter. The first end of the wire harness successively passes through the additional channel and the additional opening 143 to pass through the drag chain adapter to be further connected to the power supply. A first end opening of the turning channel is also located in the socket of the first end of the drag chain adapter and is arranged side by side with a first end opening of the additional channel.

As shown in FIG. 6, a rail slot 141 having an upper opening is provided on the second side portion of the drag chain adapter 14. One end of the lower slide rail 21 of the seat is snap-fitted into the rail slot 141 from top to bottom, two sides of the lower slide rail 21 of the seat respectively abut against two side wing plates of the rail slot 141, and a bottom of the lower slide rail 21 of the seat is positioned on a bottom baseplate of the rail slot 141. As shown in FIG. 1 and FIG. 2, after the end of the lower slide rail 21 of the seat is snap-fitted into the rail slot 141, the upper opening of the rail slot 141 is further covered by a slide rail end cover 142. The wing plates on two sides of the slide rail cover 142 are snap-fitted into receptacles 144 of the wingplates on two sides of the rail slot 141 through fasteners, as shown in FIG. 3 and FIG. 1. The snap-fitted connection between the slide rail end cover 142 and the rail slot 141 facilitates disassembly and assembly. The slide rail end cover 142 not only can play a shielding role so that an appearance of the mechanism is tidy and beautiful, but also can limit a sliding stroke of the slide rail on the seat to prevent the upper slide rail from colliding with the wire harness accommodation box or the drag chain adapter during sliding.

As shown in FIG. 1 and FIG. 2, the wire harness accommodation box 11 in this embodiment is transversely disposed on front ends of a plurality of lower slide rail 21 of the seats that are arranged in parallel, the accommodation space in the wire harness accommodation box 11 is strip-shaped, the wire harness accommodation box 11 is perpendicular to the lower slide rail 21 of the seat, the drag chain adapter 14 is L-shaped, and the turning channel 15 in the drag chain adapter is also L-shaped, so that the drag chain can smoothly shuttle in the wire harness accommodation box 11 and the lower slide rail 21 of the seat after turning by 90 degrees by passing through the drag chain adapter 14.

Two openings 110 are respectively provided at two ends of the strip-shaped accommodation space, and two drag chain adapters 14 are respectively connected to the two openings 110 and are connected to the ends of the lower slide rail 21 of the seat at a position through one of the drag chain adapters 14. Two drag chains 12 are accommodated in the accommodation space. The middle parts of the two drag chains 12 are bent by 180 degrees and are accommodated in the accommodation space. Each of the two ends of the two drag chains 12 is located at one of the openings 110. First ends of the two drag chains 12 are correspondingly connected to drag chain adapters at the ends, and second ends of the two drag chains 12 are correspondingly slidably disposed in the slideways of lower slide rails 21 of the seat at the ends. In this way, a plurality of long-stroke seats can share one wire harness accommodation box, avoiding a requirement for disposing a plurality of accommodation boxes on the floor of the vehicle body. In this embodiment, openings are provided at two ends of the wire harness accommodation box to connect two outermost lower slide rails of the seat of the plurality of lower slide rails of the seat.

Figure 12:
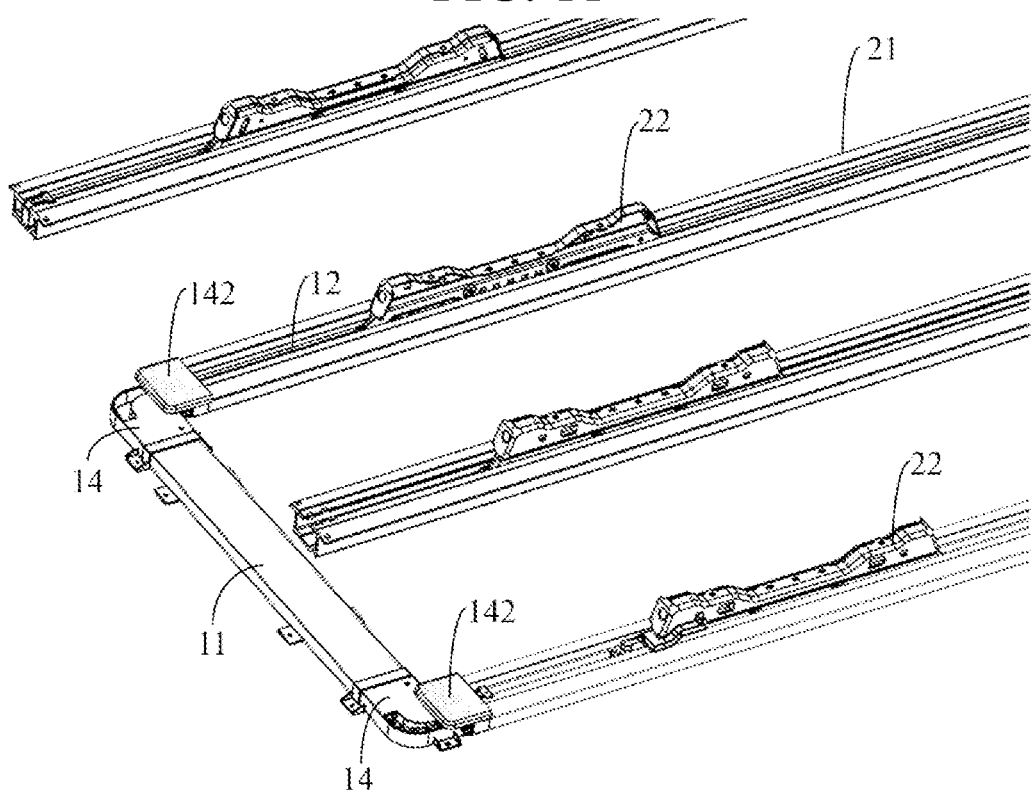
FIG. 12 is an overall schematic structural diagram of a power supply mechanism for a long-stroke seat according to a second embodiment of the present invention.

FIG. 12 illustrates an overall schematic structural diagram of a power supply mechanism for a long-stroke seat according to a second embodiment of the present invention. As shown in the figure, other structures remain unchanged, and only a length of the wire harness accommodation box 11 in this embodiment is shortened. The openings at two ends of the wire harness accommodation box 11 are respectively connected to ends of a first lower slide rail 21 of the seat and a third lower slide rail of the seat of four lower slide rails 21 of the seat through the drag chain adapters 14. This situation is applicable to seats that need relatively short strokes. Two lower slide rails 21 of the seat relatively close to each other may be selected to dispose a wire harness entrance, so as to reduce the size of the wire harness accommodation box 11 and reduce costs.

On this basis, it is easily conceived that openings and drag chains may be further provided at a periphery of the wire harness accommodation box to be connected to lower slide rail of the seats at corresponding positions through drag chain adapters. Wire harnesses of more slide rail of the seats can be easily accommodated in the wire harness accommodation box together merely by slightly adjusting shapes of turning channels in the drag chain adapters. In addition, the shape of the wire harness accommodation box is not limited to a straight line, and may also be a curve shape or other arbitrary shapes. The drag chain accommodated in the wire harness accommodation box is not limited to being bent by full 180 degrees shown in the figure, or may be bent by 90 degrees, 135 degrees, 360 degrees, or any other angles. The drag chains are even twined in the wire harness accommodation box in a shape of mosquito coils.

Figure 13:
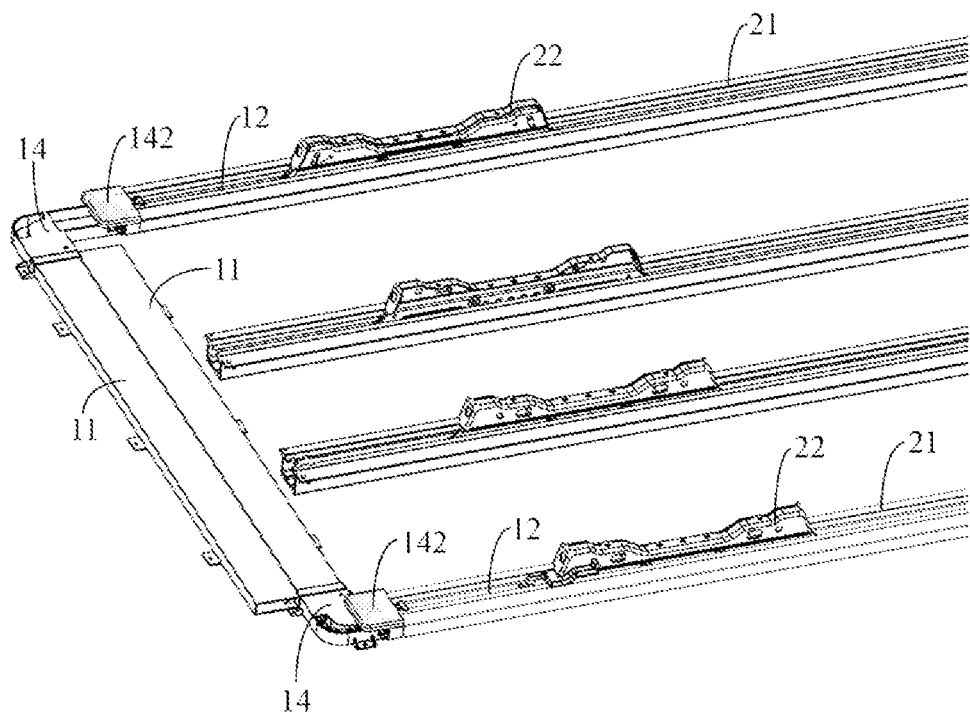
FIG. 13 is an overall schematic structural diagram of a power supply mechanism for a long-stroke seat according to a third embodiment of the present invention.

FIG. 13 illustrates an overall schematic structural diagram of a power supply mechanism for a long-stroke seat according to a third embodiment of the present invention. As shown in the figure, other structures remain unchanged, only a width size of the wire harness accommodation box 11 in this embodiment is increased (the size may be increased to twice the original width of the wire harness accommodation box). A separator may be disposed at a middle position of the width of the wire harness accommodation box to separate the internal accommodation space into two spaces, and the two drag chains are placed side by side in the two spaces to prevent the drag chains from interfering with each other. Alternatively, two wire harness accommodation boxes with having an opening at only one end are used to separately place the two drag chains. Two drag chain adapters 14 are used to be connected between openings of the wire harness accommodation box at corresponding ends and ends of lower slide rails 21 of the seat. This situation is applicable to a structure that needs a relatively long seat stroke in which the wire harness accommodation box is disposed to have double accommodation spaces, so that a longer drag chain and a longer wire harness can be accommodated, thereby satisfying the need to supply power to seats having longer strokes.

Figure 14:
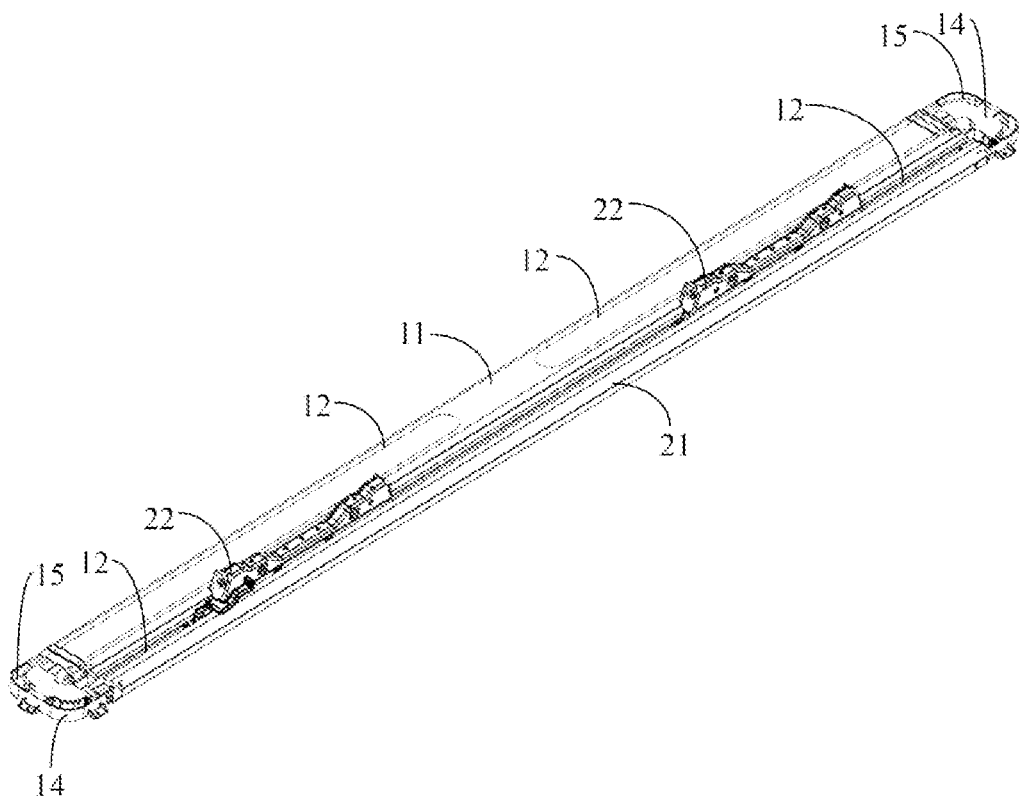
FIG. 14 is an overall schematic structural diagram of a power supply mechanism for a long-stroke seat according to a fourth embodiment of the present invention.

In addition, FIG. 14 illustrates an overall schematic structural diagram of a power supply mechanism for a long-stroke seat according to a fourth embodiment of the present invention. As shown in the figure, in this embodiment, two or more lower slide rail of the seats are disposed in a straight line. In this case, other structures remain unchanged, and only a mounting position of the wire harness accommodation box 11 is changed. The wire harness accommodation box is disposed on one side portion or two side portions of the lower slide rail 21 of the seat. Preferably, the wire harness accommodation box 11 may be integrally formed on a side portion of the lower slide rail 21 of the seat, which can save space and fix the wire harness accommodation box through the lower slide rail of the seat. In this case, the first side portion and the second side portion of the drag chain adapter 14 at the openings at two ends of the wire harness accommodation box 11 are located on the same side of the wire harness accommodation box 11, and the turning channel 15 in the drag chain adapter 14 is U-shaped, which extends through the wire harness accommodation box and the lower slide rail of the seat on two sides. The second side portion of the drag chain adapter in this embodiment may be directly fixedly connected to the end of the lower slide rail of the seat, so that the wire harness accommodation box, the drag chain adapter, and the lower slide rail of the seat are integrally formed. First ends of the two drag chains 12 are fixedly connected to drag chain adapters 14 at one ends in a one-to-one correspondence, second ends of the drag chains 12 pass through drag chain adapters at corresponding ends and are slidably disposed in a slideway of a lower slide rail of the seat at the corresponding end. One end of the wire harness is connected to the power supply, and the other end of the wire harness passes through the second end of the drag chain and is connected to the upper slide rail of the seat. The wire harness is completely hidden in the wire harness accommodation box and the lower slide rail of the seat. The wire harness may share the lower slide rail of the seat with the upper slide rail of the seat, so that the wire harness moves with the upper slide rail of the seat. The drag chain shuttles in the wire harness accommodation box and the lower slide rail of the seat with the wire harness, thereby satisfying the need to supply power to long-stroke seats.

Further, FIG. 7 illustrates a schematic diagram of a connection structure between the lower slide rail 21 of the seat and the drag chain 12 according to an embodiment of the present invention. As shown in the figure, a dovetail groove 211 is provided on an inner side wall of the slideway of the lower slide rail 21 of the seat. The dovetail groove 211 is slid matching a protrusion 120 in the drag chain 12 to form a dovetail structure, which can improve a restraining force of the drag chain 12 during sliding of the drag chain 12 inside the lower slide rail 21 of the seat, so as to reduce abnormal noise and increase sliding stability of the drag chain 12.

Figure 8:
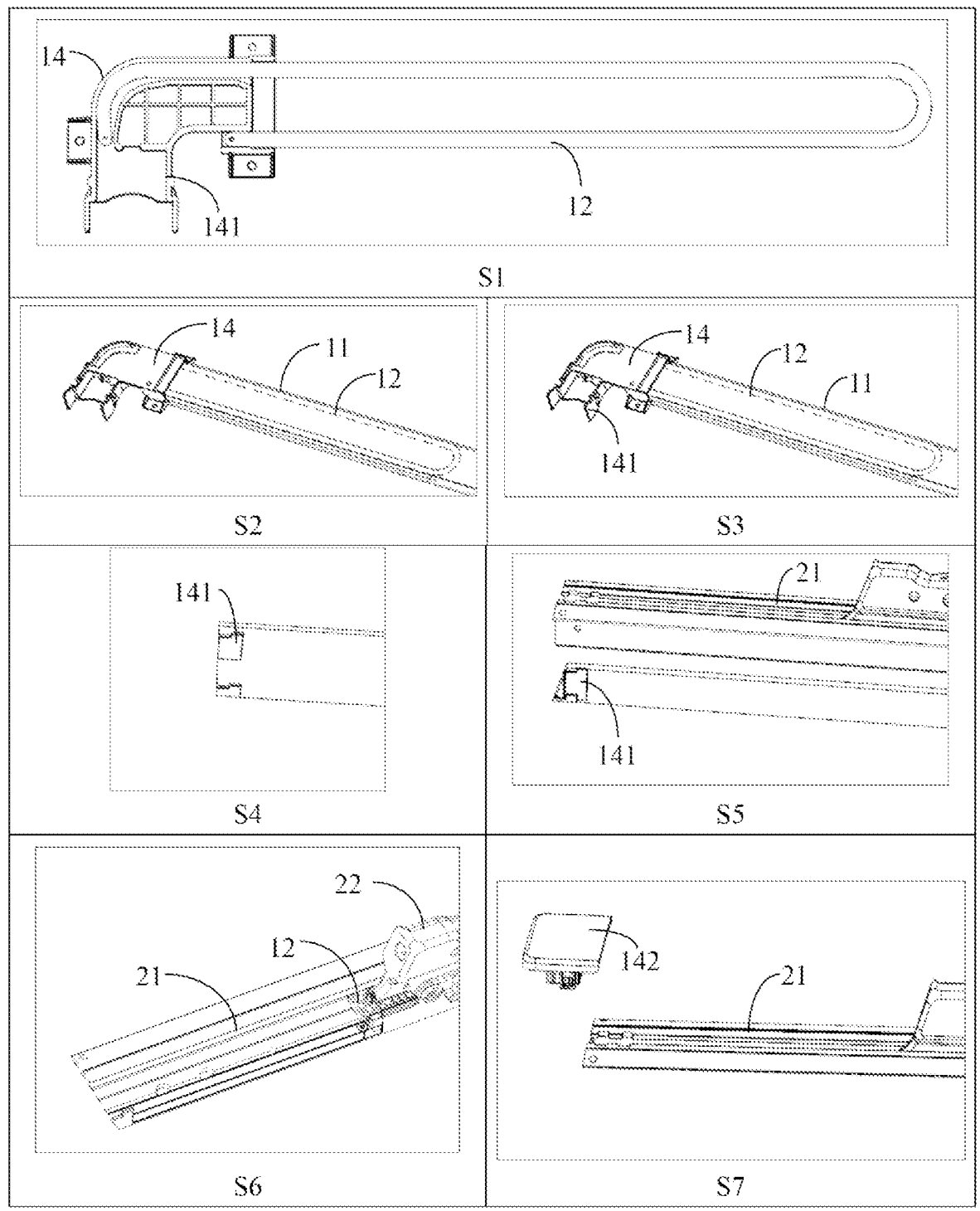
FIG. 8 is a schematic diagram of mounting steps of the power supply mechanism for a long-stroke seat according to the first embodiment of the present invention.

Mounting steps of the power supply mechanism for a long-stroke seat of the present invention are further described with reference to FIG. 8 by using the above first embodiment as an example. FIG. 8 illustrates a schematic diagram of mounting steps of the power supply mechanism for a long-stroke seat according to the first embodiment of the present invention. As shown in the figure, the mounting steps of the long slide rail include the following steps.

Step S1: Connect a drag chain 12 to a drag chain adapter 14, thread the wire harness in the drag chain 12, and mount wire harness connectors at two ends of the drag chain, where the wire harness connectors are respectively connected to the two ends of the wire harness.

Step S2: Put the drag chain 12 into the wire harness accommodation box 11 to form a small power supply assembly.

Step S3: Mount the small power supply assembly onto a floor of a vehicle body, dispose anchor plates at the bottom of the drag chain adapter and/or the bottom of the wire harness accommodation box, and form holes on the anchor plates to fix the anchor plates to the floor of the vehicle body with screws.

Step S4: Cover the floor with a vehicle body carpet, which can completely shield the small power supply assembly while exposing only the rail slot 141 on the second side portion of the drag chain adapter.

Step S5: Mount the lower slide rail 21 of the seat to the rail slot 141 from top to bottom.

Step S6: Connect the wire harness connector at the second end of the wire harness to the upper slide rail of the seat.

Step S7: Mount the slide rail end cover 142 to complete the assembly.

Figure 9:
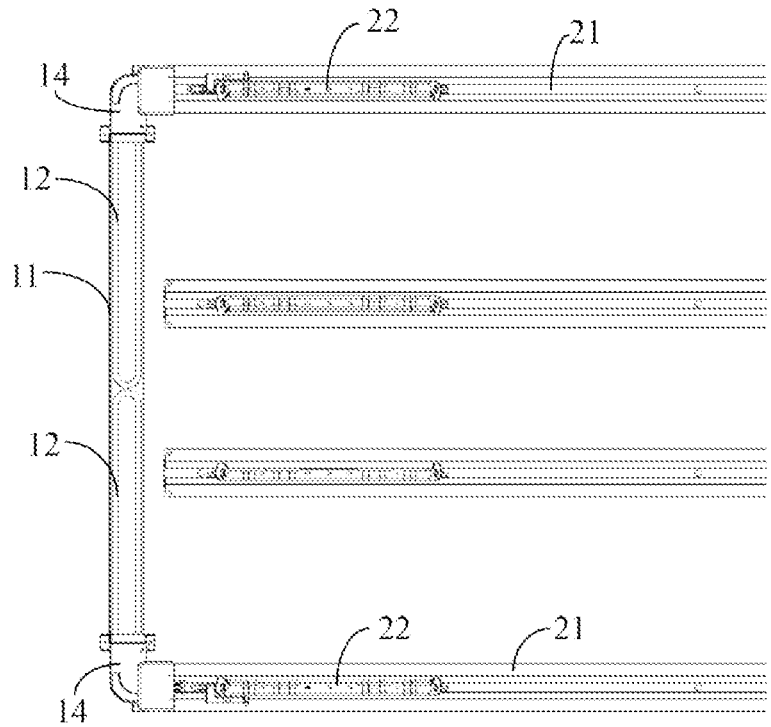
FIG. 9 is a schematic diagram of a usage status of the power supply mechanism for a long-stroke seat according to the first embodiment of the present invention when the seat is at a foremost position.
Figure 10:
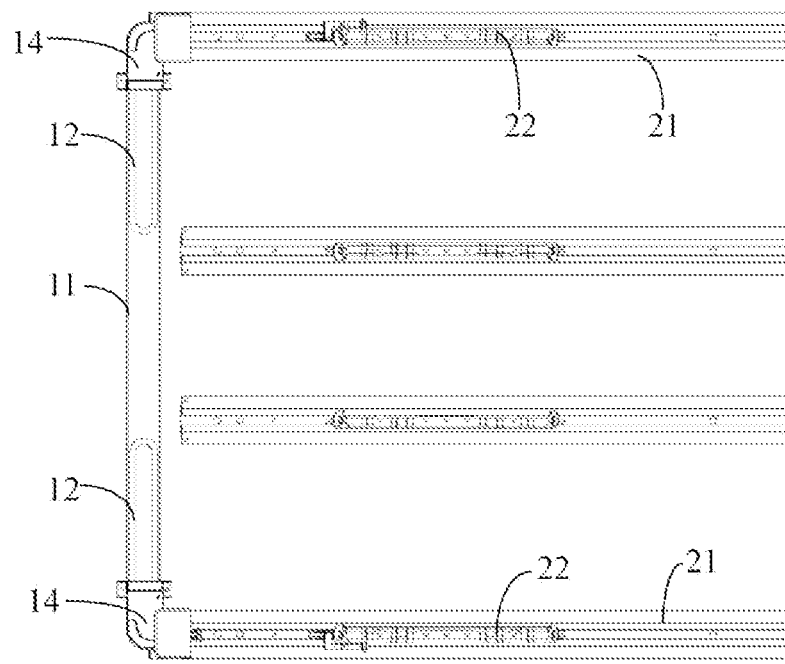
FIG. 10 is a schematic diagram of a usage status of the power supply mechanism for a long-stroke seat according to the first embodiment of the present invention when the seat is at a middle position.
Figure 11:
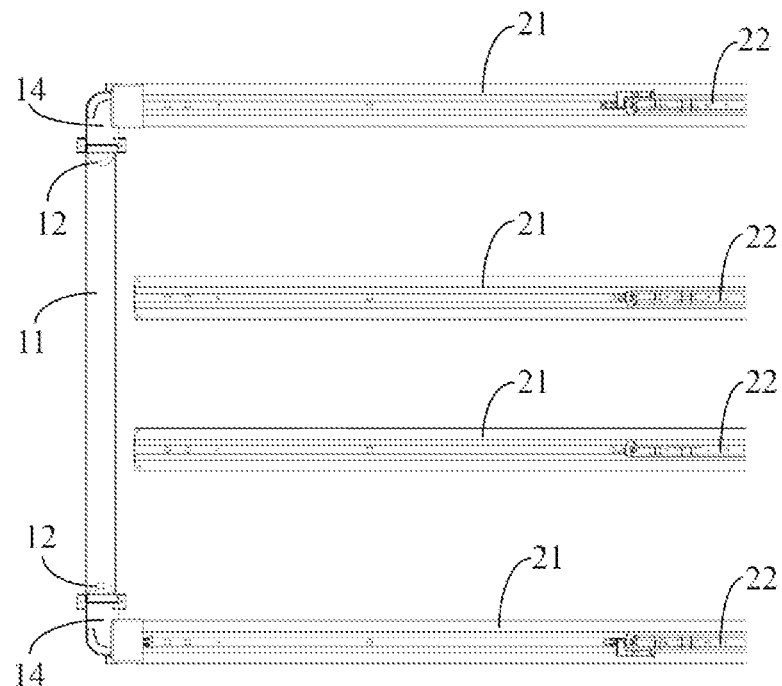
FIG. 11 is a schematic diagram of a usage status of the power supply mechanism for a long-stroke seat according to the first embodiment of the present invention when the seat is at a rearmost position.

Referring to FIG. 9 to FIG. 11, FIG. 9 illustrates a schematic diagram of a usage status of the power supply mechanism for a long-stroke seat according to the first embodiment of the present invention when a seat is at a foremost position, FIG. 10 illustrates a schematic diagram of a usage status of the power supply mechanism for a long-stroke seat according to the first embodiment of the present invention when the seat is at a middle position, and FIG. 11 illustrates a schematic diagram of a usage status of the power supply mechanism for a long-stroke seat according to the first embodiment of the present invention when the seat is at a rearmost position. As shown in the figure, during use of the long slide rail assembled according to the above steps, when the seat moves, the upper slide rail 22 of the seat at the bottom of the seat moves along the lower slide rail 21 of the seat. The upper slide rail 22 of the seat can move from a position in FIG. 9 to a position in FIG. 11 (which can return along the same way). In the process, the wire harness and the drag chain 12 can move with the upper slide rail of the seat due to being connected to the upper slide rail of the seat at one ends. The wire harness and the drag chain 12 move in the slideway of the lower slide rail 21 of the seat. By sharing the slideway with the upper slide rail 22 of the seat, the drag chain 12 in the wire harness accommodation box 11 continuously moves toward the inside of the lower slide rail 21 of the seat. When the seat returns, the drag chain 12 can move in a reverse direction in the lower slide rail 21 of the seat to return to the wire harness accommodation box 11.

It should be noted that the structures, proportions, sizes, and the like shown in the drawings of the specification, in coordination with the content disclosed in the specification, are only used to help a person skilled in the art to read and understand, and they are not intended to limit the conditions under which the present invention can be implemented and therefore have no technical significance. Any modifications to the structure, changes to the proportional relationship or the adjustment on the size should fall within the scope of the technical content disclosed by the present invention without affecting the effects and the objectives that can be achieved by the present invention. In addition, the terms such as "upper", "lower", "left", "right", "middle", and "a" mentioned in this specification are also merely for facilitating clear descriptions, but are not intended to limit the scope of implementation of the present invention. Without substantially changing the technical contents, changes or adjustments of relative relationships thereof should also fall within the scope of implementation of the present invention.

The foregoing descriptions are merely preferred embodiments of the present invention, and are not intended to limit the present disclosure in any form. Although the present disclosure has been disclosed above through the preferred embodiments, the embodiments are not intended to limit the present disclosure. A person skilled in the art can make some equivalent variations, alterations or modifications to the above-disclosed technical content without departing from the scope of the technical solutions of this application to obtain equivalent embodiments. Any simple alteration, equivalent change or modification made to the above embodiments according to the technical essence of the present disclosure without departing from the content of the technical solutions of this application shall fall within the scope of the technical solutions of the present disclosure.

What is claimed is:

1. A power supply mechanism for a long-stroke seat firmly situated on top of an upper slide rail that is slidably connected to a lower slide rail, the power supply mechanism consisting essentially of:
   a wire harness accommodation box having at least one accommodation space and at least one opening in communication with the accommodation space;
   a drag chain movably received in the accommodation space in a closed U shape and directly extendably out of the wire harness accommodation box from the opening to be received inside the lower slide rail and connected to the upper slide rail, the drag chain having a first end securely fixed to the wire harness accommodation box and a second end securely connected to the upper slide rail such that when the upper slide rail moves, the drag chain is moved inside the wire harness accommodation box and the lower slide rail; and
   a drag chain adapter sandwiched between the wire harness accommodation box and the lower slide rail so that the drag chain is able to smoothly move between the wire harness accommodation box and the lower slide rail;
   wherein a rail slot having an upper opening is provided on the drag chain adapter for the lower slide rail to be vertically snap-fitted therein, and the upper opening of the rail slot is covered by a slide rail end cover.

2. The power supply mechanism for a long-stroke seat according to claim 1, wherein the second end of the drag chain is threaded in a turning channel defined in the drag chain adapter, the first end of the drag chain is fixedly connected to the first side portion of the drag chain adapter, an additional channel and an additional opening that are opened to the first end of the drag chain are further provided on the drag chain adapter, and the first end of the wire harness successively passes through the additional channel and the additional opening to be connected to the power supply.

3. The power supply mechanism for a long-stroke seat according to claim 1, wherein a dovetail structure for matched sliding is provided on a surface of an inner wall of the slideway of the lower slide rail of the seat that contacts the drag chain.

4. The power supply mechanism for a long-stroke seat according to claim 3, wherein the accommodation space is strip-shaped, two openings are respectively provided at both ends of the strip-shaped accommodation space, two drag chains are disposed in the accommodation space, and two ends of each of the drag chains are correspondingly disposed at one of the openings.

5. The power supply mechanism for a long-stroke seat according to claim 4, wherein
   the two drag chains are disposed on two longitudinal sides of the accommodation space in a length direction of the accommodation space; or
   the two drag chains are disposed on two lateral sides of the accommodation space in a width direction of the accommodation space, and a middle separator for separating the two drag chains is disposed in the accommodation space.

\* \* \* \* \*